US008320219B1

(12) United States Patent
Wolf et al.

(10) Patent No.: US 8,320,219 B1
(45) Date of Patent: Nov. 27, 2012

(54) TRAILING EDGE OPTIMIZED NEAR FIELD TRANSDUCER

(75) Inventors: Christopher B. Wolf, San Jose, CA (US); Eric J. Champion, San Jose, CA (US); Kroum S. Stoev, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 200 days.

(21) Appl. No.: 12/815,934

(22) Filed: Jun. 15, 2010

(51) Int. Cl.
G11B 11/00 (2006.01)
(52) U.S. Cl. ............ 369/13.33; 369/112.27; 360/125.74
(58) Field of Classification Search ............... 369/13.33, 369/13.32, 13.24, 13.14, 13.03, 13.02, 13.35, 369/112.27; 360/59, 125.31, 125.74; 451/5
See application file for complete search history.

(56) References Cited

U.S. PATENT DOCUMENTS

| | | | |
|---|---|---|---|
| 5,199,090 A | 3/1993 | Bell | |
| 6,795,630 B2 | 9/2004 | Challener et al. | |
| 6,834,027 B1 | 12/2004 | Sakaguchi et al. | |
| 6,930,975 B2 | 8/2005 | Tawa et al. | |
| 7,215,629 B2 | 5/2007 | Eppler | |
| 7,266,268 B2 | 9/2007 | Challener et al. | |
| 7,272,079 B2 | 9/2007 | Challener | |
| 7,330,404 B2 | 2/2008 | Peng et al. | |
| 7,412,143 B2 | 8/2008 | Rottmayer et al. | |
| 7,440,660 B1 | 10/2008 | Jin et al. | |
| 7,500,255 B2 | 3/2009 | Seigler et al. | |
| 7,567,387 B2 | 7/2009 | Itagi et al. | |
| 7,596,072 B2 | 9/2009 | Buechel et al. | |
| 7,609,480 B2 | 10/2009 | Shukh et al. | |
| 8,164,855 B1 | 4/2012 | Gibbons et al. | |
| 2003/0112542 A1 | 6/2003 | Rettner et al. | |
| 2003/0128634 A1 | 7/2003 | Challener | |
| 2003/0137772 A1 | 7/2003 | Challener | |
| 2003/0184903 A1 | 10/2003 | Challener | |
| 2004/0001394 A1 | 1/2004 | Challener et al. | |
| 2004/0001420 A1 | 1/2004 | Challener | |
| 2005/0052771 A1 | 3/2005 | Rausch et al. | |
| 2005/0078565 A1 | 4/2005 | Peng et al. | |
| 2007/0159720 A1 | 7/2007 | Sohn et al. | |
| 2007/0165495 A1 | 7/2007 | Lee et al. | |
| 2008/0005543 A1 | 1/2008 | Rychlik | |
| 2008/0181560 A1 | 7/2008 | Suh et al. | |
| 2008/0232225 A1 | 9/2008 | Cho et al. | |
| 2010/0321815 A1 | 12/2010 | Zhou et al. | |
| 2011/0090588 A1* | 4/2011 | Gao et al. ........................ 360/59 |
| 2011/0235480 A1* | 9/2011 | Goulakov et al. .......... 369/13.35 |
| 2011/0286127 A1* | 11/2011 | Gao et al. ........................ 360/59 |
| 2011/0294398 A1 | 12/2011 | Hu et al. | |

* cited by examiner

Primary Examiner — Ali Neyzari

(57) ABSTRACT

An energy assisted magnetic recording (EAMR) head for writing to a recording media is disclosed. The EAMR head includes a write pole for providing a magnetic field for writing to the recording media; and a near field transducer disposed adjacent to the write pole and comprising a disk section and a pin section extending towards an air bearing surface (ABS) from the disk section. At least a portion of the pin section is electrically isolated from the write pole by an insulator material.

21 Claims, 8 Drawing Sheets

TRAILING EDGE OPTIMIZED NEAR FIELD TRANSDUCER

FIELD OF THE INVENTION

The present invention generally relates to magnetic read/write heads and, in particular, relates to trailing edge optimized near field transducers.

BACKGROUND

To increase the areal storage density of a magnetic recording device, the recording layer thereof may be provided with smaller and smaller individual magnetic grains. This reduction in grain size soon reaches a "superparamagnetic limit," at which point the magnetic grains become thermally unstable and incapable of maintaining their magnetization. The thermal stability of the magnetic grains can be increased by increasing the magnetic anisotropy thereof (e.g., by utilizing materials with higher anisotropic constants). Increasing the magnetic anisotropy of the magnetic grains, however, increases their coercivity and therefore requires a stronger magnetic field to change the magnetic orientation of the grains (e.g., in a write operation).

Energy-assisted magnetic recording (EAMR) is used to address this challenge. In an EAMR system, a small spot where data is to be written is locally heated to reduce the coercivity of the magnetic grains therein for the duration of the write operation, thereby allowing materials with increased magnetic anisotropy to be used, and greater areal storage density to be exploited. In EAMR approach, a semiconductor laser diode is normally used as a light source and coupled to a planar waveguide which serves as light delivery path. A grating structure may be used to couple the laser light into the waveguide. Design challenges for these grating structures include improving their coupling efficiency and the difficulty in aligning a light source for high volume manufacturing processes. The coupled light is then routed to a near field transducer (NFT) by which the optical energy is provided to a small optical spot on the recording media a few tens of nanometers (nm) in size. The optical energy provided to the small optical spot generates a thermal spot in the recording media.

In order to write at higher densities, a smaller thermal spot is desired. Because the conventional magnetic recording medium typically includes lower thermal conductivity underlayers, the thermal spot is typically larger than the optical spot. Thus an even smaller optical spot is desired at higher densities. In order to obtain a smaller optical spot, optical components within the conventional EAMR system need to be scaled down to small sizes. Fabrication of portions of the conventional NFT, at such small sizes may be challenging. For example, a width of a pin section of the NFT (the "pin width") becomes vanishingly small at high areal density. In addition, with a conventional NFT arrangement, the trailing edge of the thermal spot has a high degree of curvature, which limits the track density due to SNR degradation from the track curvature.

Accordingly, what is needed is a system and method for optimizing the trailing edge of the thermal spot in a recording media.

BRIEF SUMMARY OF THE INVENTION

An energy assisted magnetic recording (EAMR) head for writing to a recording media is provided. The EAMR head can comprise a write pole for providing a magnetic field for writing to the recording media. The EAMR head can further comprise at least one laser for providing energy to the recording media to assist the writing. The EAMR head can further comprise a near field transducer (NFT) disposed adjacent to the write pole and coupled with the at least one laser, the NFT configured to direct the energy to a corresponding thermal spot on the recording media. The NFT can comprise a disk section and a pin section extending towards an air bearing surface (ABS) from the disk section, wherein at least a portion of the pin section is separated from the write pole by an insulating layer.

An energy assisted magnetic recording (EAMR) head for writing to a recording media is provided. The EAMR head can comprise a write pole for providing a magnetic field for writing to the recording media. The EAMR head can further comprise a near field transducer disposed adjacent to the write pole and comprising a disk section and a pin section extending towards an air bearing surface (ABS) from the disk section, wherein at least a portion of the pin section is electrically isolated from the write pole by an insulator material.

DETAILED DESCRIPTION

Figure 1:
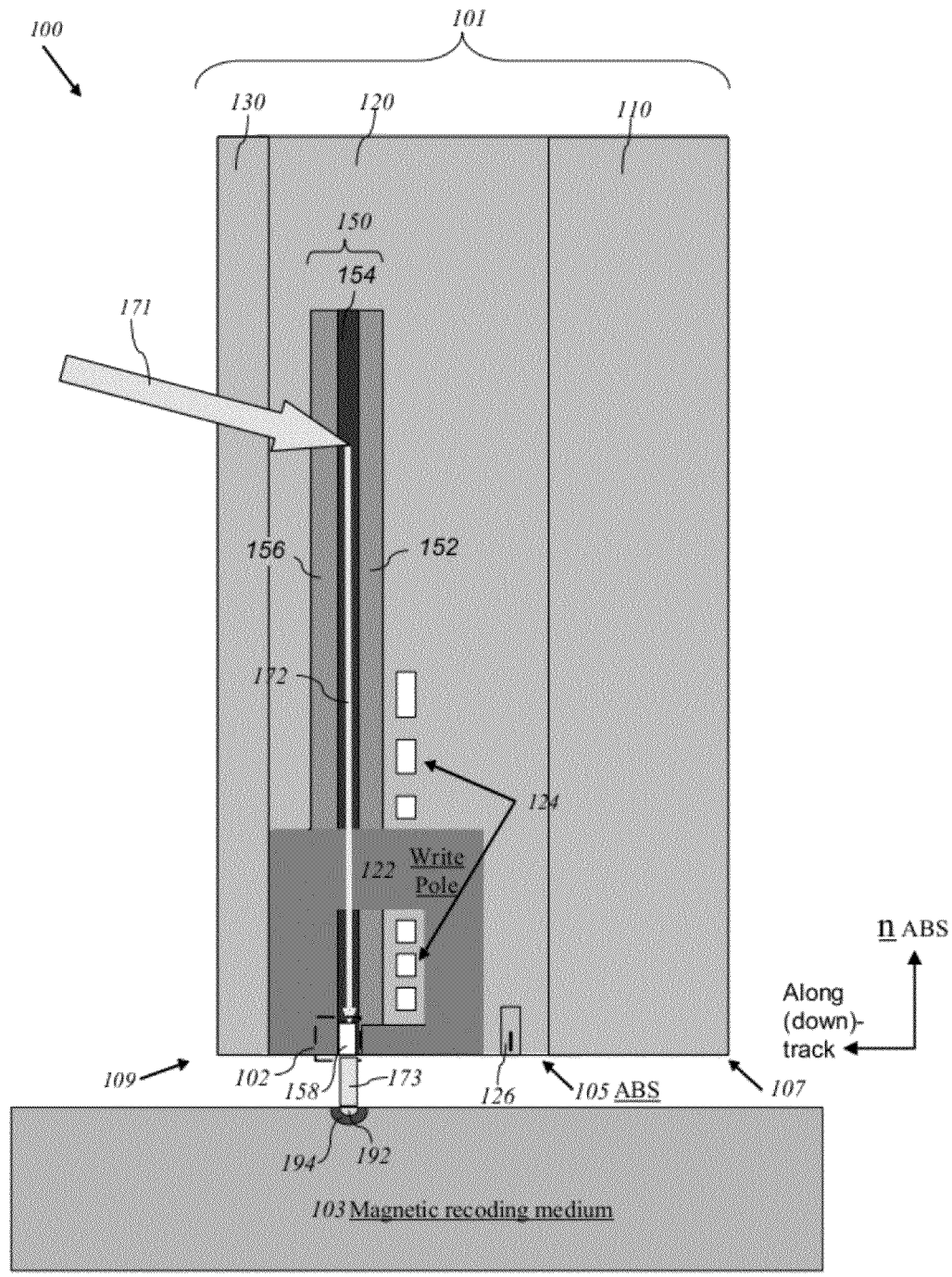
FIG. 1 is a diagram depicting a cross-sectional view of an exemplary EAMR head according to certain aspects of the subject disclosure.

FIG. 1 is a diagram depicting a cross-sectional view of an exemplary EAMR head 100 according to certain aspects of the subject disclosure. The EAMR head 100 comprises a slider 101. The slider 101 comprises a substrate 110, a recorder/reader layer 120 disposed over the substrate 110, and an overcoat layer 130 disposed over the recorder/reader layer 120. In certain embodiments, the substrate 110 comprises AlTiC and the overcoat layer 130 comprises alumina. The slider 101 has a leading edge 107 and a trailing edge 109, and an air-bearing surface (ABS) 105 facing a magnetic recording medium 103. The recorder/reader layer 120 of the slider 101 includes a write pole 122 for recording or erasing information on the medium 103 by focusing a magnetic field on a spot on the medium 103, a coil 124 for generating the magnetic field, a reader 126 for reading a magnetic bit recorded on the medium 103, and a waveguide structure 150. The waveguide structure 150 includes a first, top clad layer 156 and a second, bottom clad layer 152 surrounding a waveguide core layer 154. In certain embodiments, the waveguide structure 150 may further include a structure (e.g., a grating) that is configured to couple incident EM radiation 171 (e.g., optical beam from a laser) into the waveguide core layer 154 to form a coupled optical beam 172. The EAMR head 100 further includes an NFT arrangement 102 that comprises a near field transducer (NFT) 158 formed at a distal end of the waveguide structure 150 proximate the ABS 109. A conventional NFT arrangement/design 102" is provided in FIG. 2, and a novel NFT arrangement 102" according to certain aspects of the subject disclosure is provided in FIG. 3. The NFT 158 is configured to concentrate energy from the coupled optical beam 172 to a nano-sized optical spot 192 on the recording medium 103 well below the diffraction limit from which standard focusing lenses suffer.

During the operation of a hard disk drive comprising the EAMR head 100, the magnetic recording medium 103 rotates at high speed, and air flowing at high speed between the ABS 105 and the magnetic recording medium 103 provides an upward force to the slider 101 such that the slider 101 is maintained at a certain height from the magnetic recording medium 103. A portion of the incident EM radiation 171 arrived at the waveguide structure 150 is coupled into the waveguide core layer 154 to form a coupled optical beam 172 traveling down the waveguide core layer 154 toward the ABS 105. The energy from the coupled optical beam 172 is concentrated onto a nano-sized optical spot 192 on the magnetic recording medium 103 by means of the NFT 158. At least a portion of the coupled optical beam 172 (and its associated energy) exits the ABS 105 in the form of a focused optical beam 173 and is concentrated onto a nano-sized optical spot 192 on the recording medium 103. Some of the optical energy delivered to the optical spot 192 is absorbed by and converted into heat in the magnetic recording medium 103. The opto-thermal conversion produces a thermal spot 194 on the recording medium 103. The thermal spot 194 on the magnetic recording medium 103 is subsequently subjected to a pulse of write magnetic field from the write pole 122.

Figure 2:
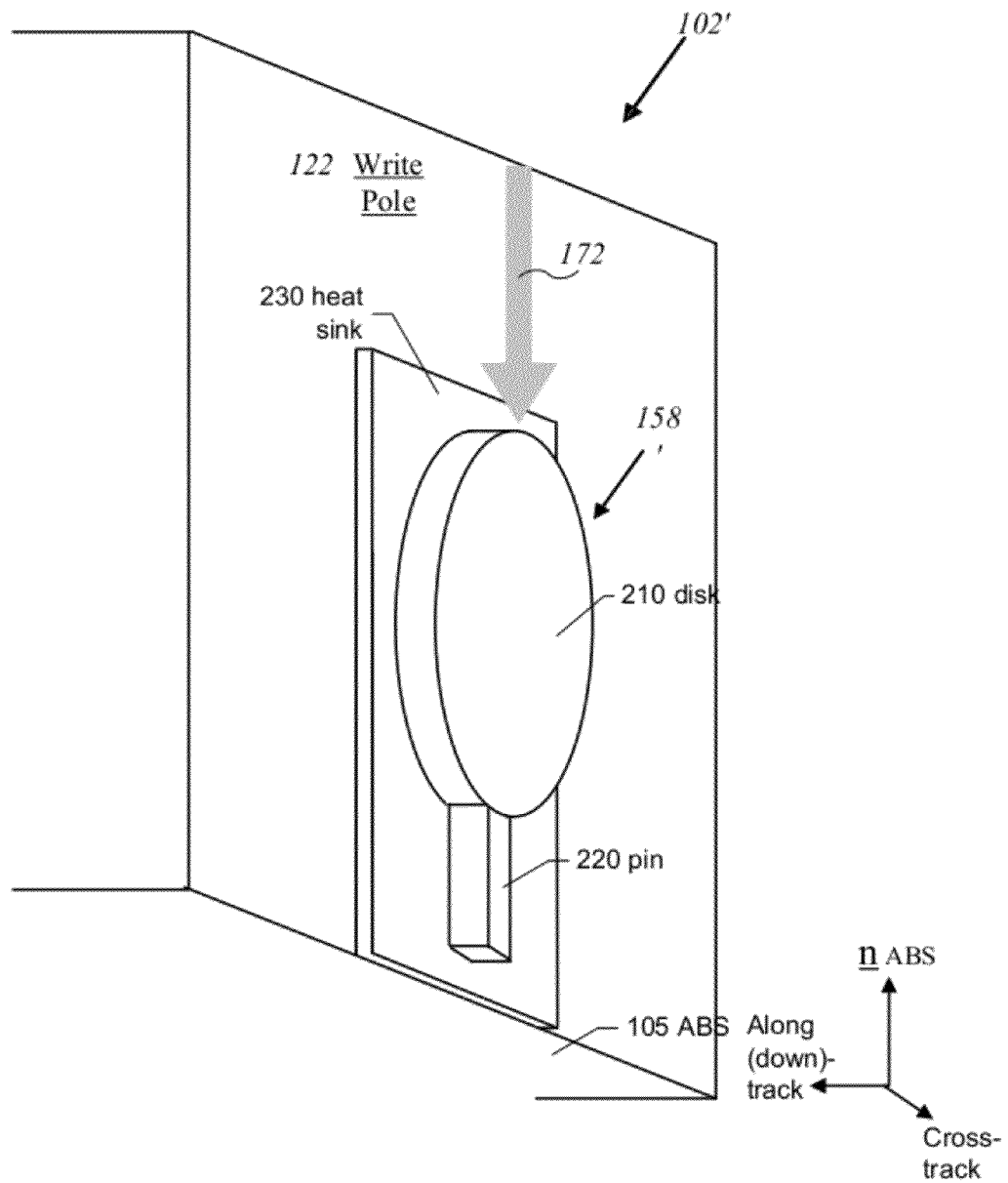
FIG. 2 is a diagram depicting a perspective view of a conventional NFT arrangement that may be employed in an EAMR head.

FIG. 2 is a diagram depicting a perspective view of a conventional NFT arrangement 102' that may be employed in an EAMR head (e.g., EAMR head 100 of FIG. 1). The conventional NFT arrangement 102' includes an NFT 158' separated from write pole 122 by a heat sink layer 230. In the depicted example, the NFT 158' is a "Puccini-type" NFT having a disk section 210 and a pin section 220 extending towards the ABS 105. The pin section 220 has a rectangular cross-section in a plane parallel to the ABS 105 along the entire length of the pin section 220. The NFT 158' may comprise of a metal (e.g., Au, Ag) capable of supporting a surface-plasmon resonance (SPR) therein. In the conventional NFT arrangement 102', the disk and pin sections 210, 220 of the NFT 158' are coupled to and separated from the write pole 122 by the heat sink layer 230 comprising a conductive metal (e.g., Cu) for efficiently dissipating heat generated in the NFT 158 from the coupled optical beam 172 into the write pole 122.

In operation, an optical energy received from the coupled optical beam 172 excites a surface-plasmon resonance (SPR) in the NFT 158'. As the EM energy associated with the SPR travels down the pin section 220 towards the ABS 105, a portion of the EM energy flows into the write pole 122 in the form of a skin-depth penetration through the conductive heat sink layer 230. The portion of the EM energy thus penetrated into the write pole 122 travels down towards the ABS 105 in a separate path in the write pole 122 and creates a curvature in the trailing edge of the thermal spot 194.

Figure 3:
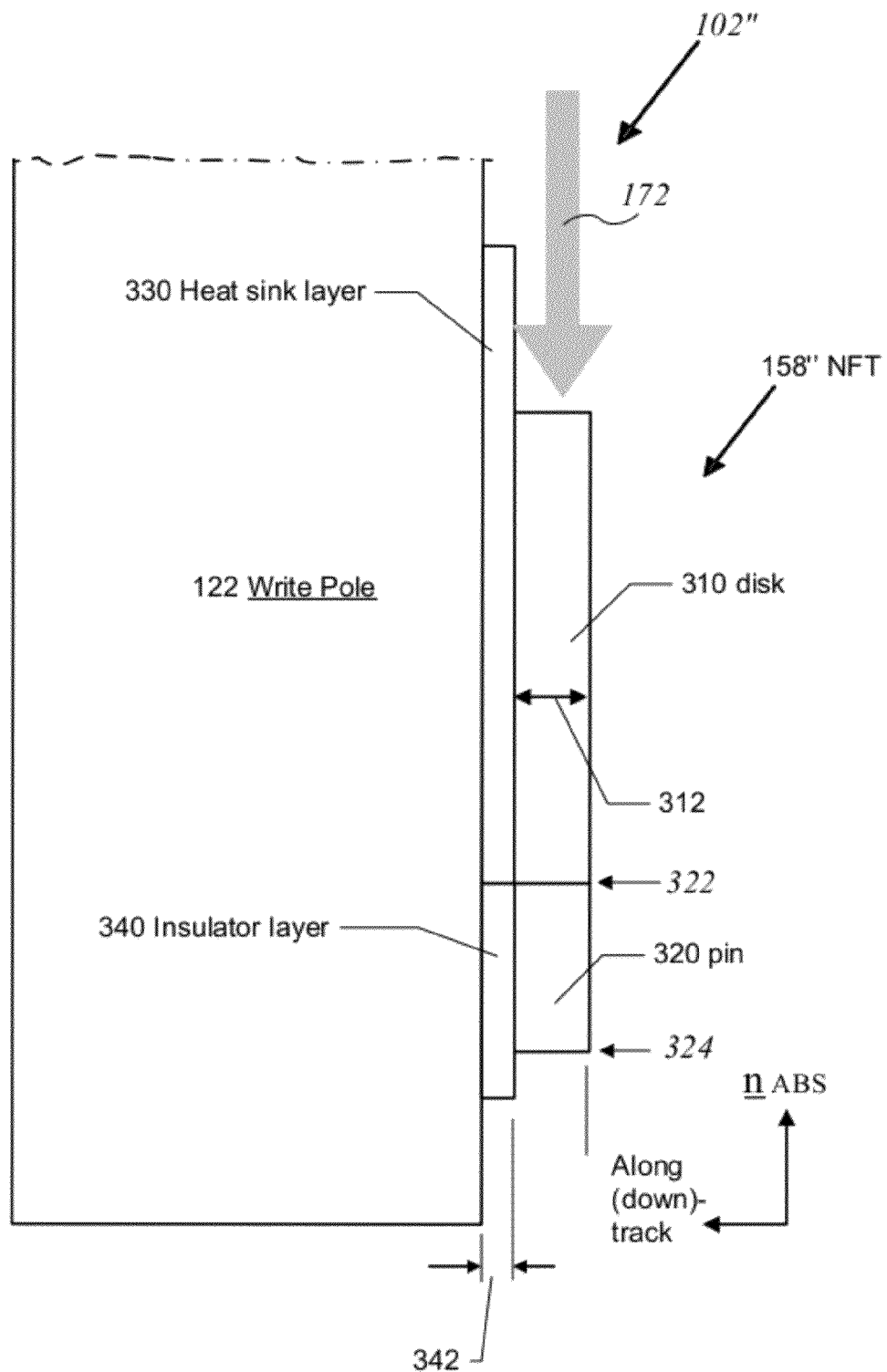
FIG. 3 is a diagram depicting a cross-sectional view of an exemplary NFT arrangement according to certain aspects of the subject disclosure.

FIG. 3 is a diagram depicting a cross-sectional view of an exemplary NFT arrangement 102" according to certain aspects of the subject disclosure. For ease of illustration only, without any intent to limit the scope of the subject disclosure in any way, the following description of the exemplary NFT arrangement 102" makes references to elements of the EAMR head 100 of FIG. 1. However, one skilled in the art shall appreciate that the various embodiments of the subject disclosure may be applied to other types of EAMR heads without departing from the scope of the subject disclosure.

The exemplary NFT arrangement 102" includes an NFT 158" disposed adjacent to the write pole 122. In the illustrated embodiment, a disk section 310 of the NFT 158" is separated from the write pole 122 by a heat sink layer 330, while a pin section 320 of the NFT 158" is separated from the write pole 122 by an insulator layer 340.

In certain embodiments, the NFT 158" is a Puccini-type NFT having a circular disk section. In other embodiments, the disk section 310 of the Puccini-type NFT can have non-circular shapes including, but not limited to, an oval, an elipse, a rectangle, a square, and other regular or non-regular polygons. The pin section 320 can have a rectangular cross-section in a plane parallel to the ABS. Alternatively, the pin section 320 can have a non-rectangular cross section in a plane parallel to the ABS as will be discussed in detail below with respect to FIGS. 5A, 5B, and 5C.

In certain embodiments, the insulator layer 340 comprises an electrically insulating material such as $Si_3N_4$, $Al_2O_3$, AlN, GaN, $SiO_2$, and $BN_4$. In some embodiments, the insulator layer 340 comprises a thermally, but not electrically, insulating material. In the illustrated example, the insulator layer 340 starts at a proximal end 322 of the pin section 320 and extends beyond a distal end 324 of the pin section 320. In alternative embodiments, the insulator layer 340 may start from a point in the disk portion 310 of the NFT 310 or a point in the pin section 320 between the proximal and distal ends 322, 324 and may extend beyond the distal end 324 or end at the distal end 324.

As with the conventional NFT arrangement of FIG. 2, an optical energy received from the coupled optical beam 172 excites a SPR in the NFT 158". As the EM energy associated with the SPR travels down the pin section 320 towards the ABS 105, however, no significant portion of the EM energy flows into the write pole 122 because a skin-depth penetration of the EM energy is prevented by the presence of the insulator layer 340 disposed between the pin region 320 and the write pole 122. The absence of the skin-depth penetration into the write pole 122, in turn, prevents or reduces a corresponding curvature in the trailing edge of the thermal spot 194 in the recording medium 103.

The heat sink layer 330 disposed between the disk section 310 and the write pole 122 provides an effective transfer of heat from the NFT 158" to the write pole 122. The heat sink layer 330 can comprise a metal that can provide such an effective heat transfer, non-limiting examples of which include Cu, Agu, Ag, and Al. In some embodiments, the heat sink layer 330 comprises a metal (e.g., Cu) that provides an effective heat transfer between the NFT 158" and the write pole 122, yet does not itself support SPR or at least does not support SPR as effectively as the material (e.g., Au) comprising the NFT 158". This ensures that the SPR resonance excited in the NFT 158" is either not sufficiently extended into the heat sink layer 330 and possibly into the write pole 122, thereby preventing another source of energy draw from the NFT 158".

At least the disk section 310 of the NFT 158" comprises a metal capable of supporting SPR in the disk section when subjected to the optical energy 172. The metal can be, for example, Au, Ag, Cu, Al, or a combination thereof. In some embodiments, the disk section 310 and the pin section 320 of the NFT 158" comprise one if such metals. In one particular embodiment, the disk and pin sections 31, 320 are made of Au. The disk region 310 (and the pin section 320) can have a thickness 312 in an along-track direction of between about 10 and 100 nm. The disk region 310 (and the pin section 320) can have a width in a cross-track direction of between about 10 and 500 nm. The insulator layer 340 (and the heat sink layer 330) can have a thickness 342 in an along-track direction of between about 10 and 100 nm. The insulating layer 340 (and the heat sink layer 330) can have a width in a cross-track direction of between about 10 and 200 nm.

Figure 4:
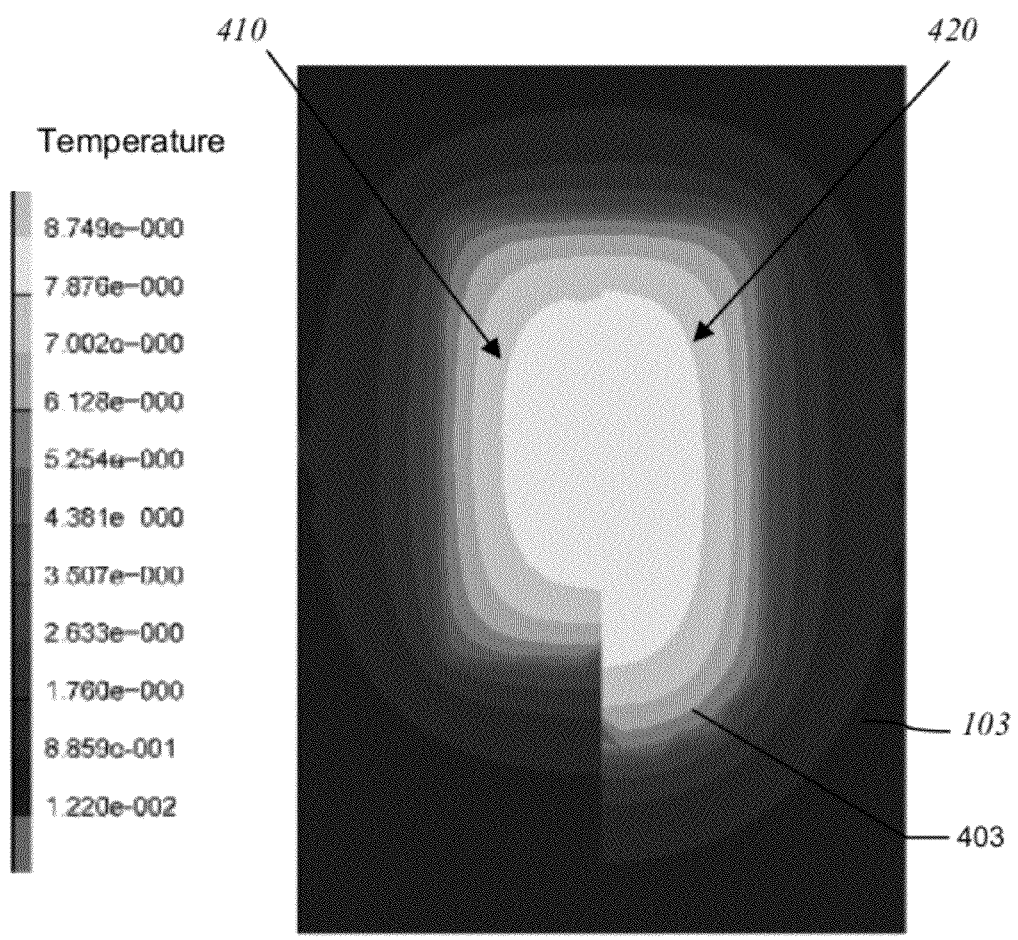
FIG. 4 shows a first simulated thermal spot associated with the exemplary NFT arrangement of FIG. 3 juxtaposed against a second simulated thermal spot associated with the conventional NFT arrangement of FIG. 2 according to certain aspects of the subject disclosure.

FIG. 4 shows a first simulated thermal spot 410 associated with the exemplary NFT arrangement 102" of FIG. 3 juxtaposed against a second simulated thermal spot 420 associated with the conventional NFT arrangement 102' of FIG. 2. In both cases, the NFTs 158', 158" are assumed to be a Puccini pin having a rectangular disk section 210, 310 and a rectangular pin cross section. The NFTs 158', 158" are assumed to be comprised of Au and the heat sink layers 230, 330 are assumed to be Cu. The trailing edge of the thermal spot 410 terminates at the NFT and does not extend substantially into a region of recording medium 103 below write pole (e.g., 122). By contrast, the trailing edge of the thermal spot 420 extends beyond the NFT and into a region 403 of the recording medium 103 below write pole (e.g., 122).

Figure 8:
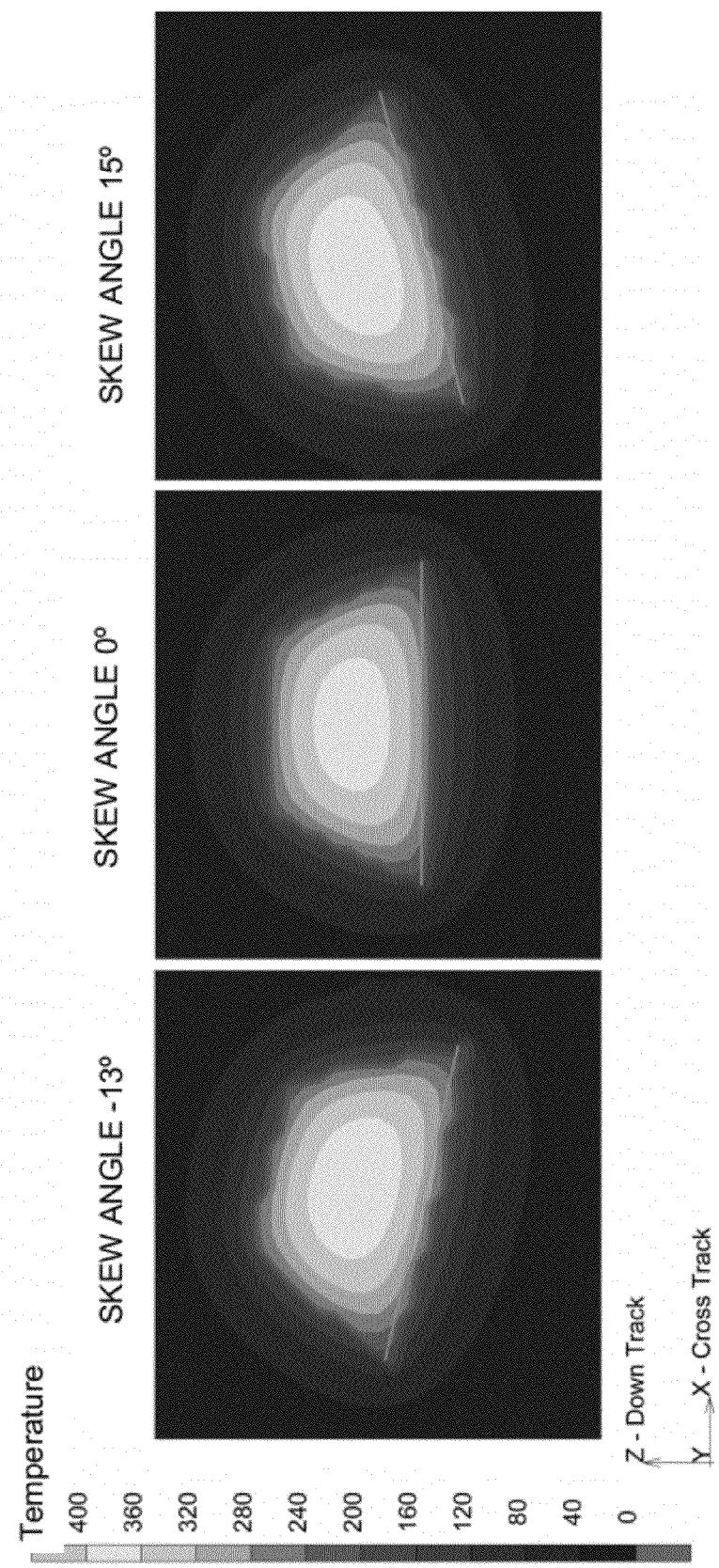
FIG. 8 shows thermal spots at different skew angles that demonstrate skew angle track performance and the lower curvature obtained by the use of a trapezoidal NFT in accordance with one aspect of the subject disclosure.

In the illustrated embodiment of FIG. 3, the pin section 320 of the NFT 158" has a rectangular cross-section in a plane parallel to the ABS. In other embodiments of the subject disclosure, the NFT 158" may have a non-rectangular pin cross section, at least at its distal end facing the ABS 105. Such a non-rectangular pin cross section can further optimize (e.g. flatten) the trailing edge of the thermal spot produced by the NFT. By utilizing a pin with a non-rectangular (e.g., trapezoidal) cross-section, a number of advantages are provided including optimizing (e.g. flattening) the trailing edge of the thermal spot, increasing the thermal gradient at the transition, which provides for a more efficient EAMR writing, and lessening the transition curvature, which provides for a better shingle EAMR implementation and better track performance with skew angle. FIG. 8 show thermal spots at different skew angles that demonstrate skew angle track performance and the lower curvature obtained by the use of a trapezoidal NFT in accordance with one aspect of the subject disclosure.

Figure 5:
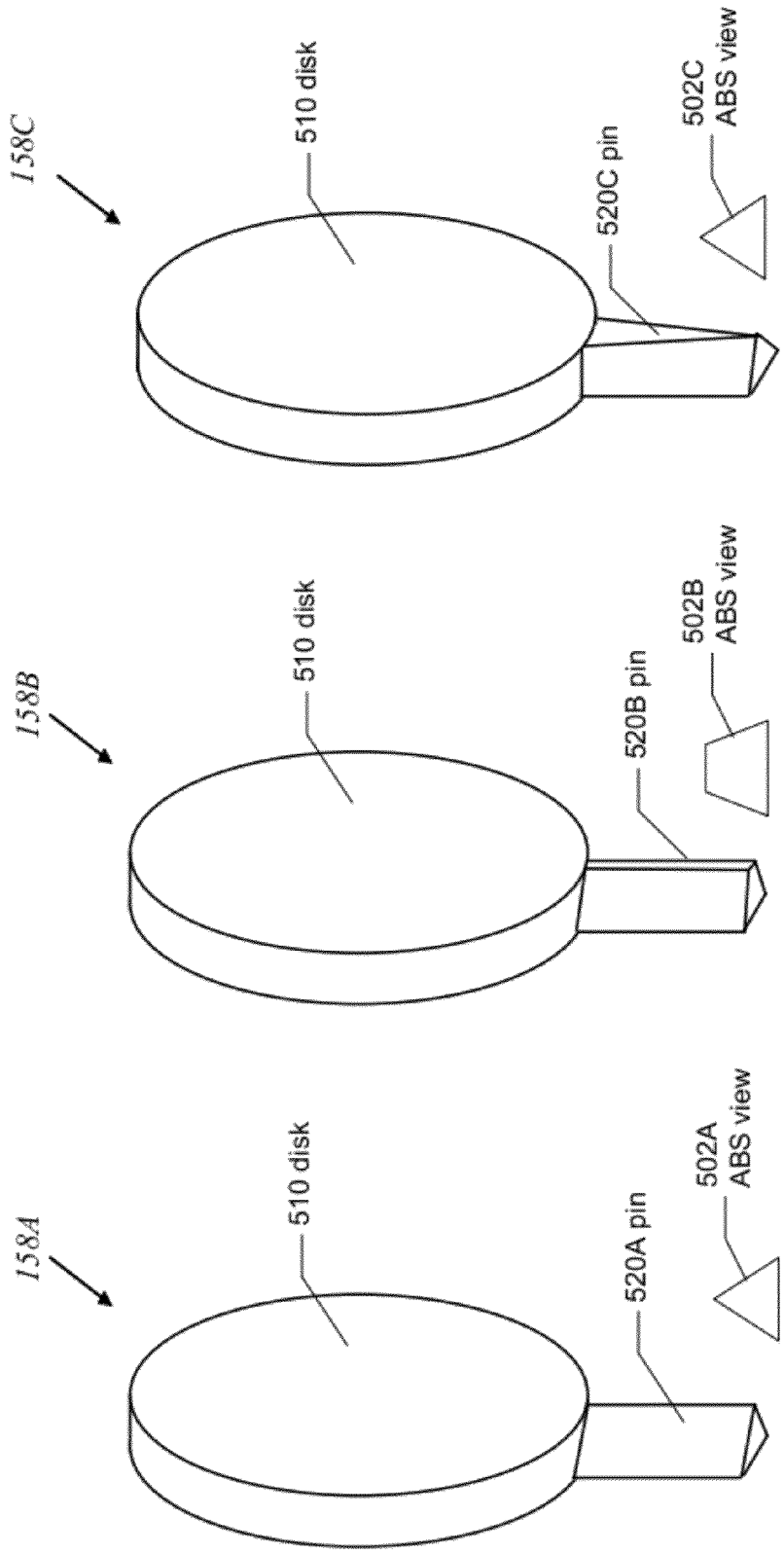
FIGS. 5A, 5B, and 5C are diagrams depicting exemplary first, second, and third Puccini-type NFTs having non-rectangular pin cross sections, respectively, in a plane parallel to the ABS according to certain aspects of the subject disclosure.

FIGS. 5A, 5B, and 5C are diagrams depicting exemplary first, second, and third Puccini-type NFTs 158A, 158B, 158C having non-rectangular pin cross sections 502A, 502B, 502C, respectively, in a plane parallel to the ABS, at least at distal ends of pin sections 520A, 520B, 520C. In the first NFT 158A, the non-rectangular pin cross section 502A is triangular. In the second NFT 158B, the non-rectangular pin cross section is trapezoidal. The pin section 520C of the third NFT 158C has a rectangular pin cross section at its proximal end facing the disk section 510 and the triangular pin cross section 502C at its distal end facing the ABS.

A multitude of variations can be made to the NFTs 158A, 158B, 158C without departing from the scope of the subject disclosure. For example, the NFTs may have other non-rectangular cross-sectional shapes including, but not limited to, a semicircle. a semi-polygon (e.g., an upper half of a hexagon or octagon), and a chevron. The disk 510 may have non-circular shapes including, but not limited to, an oval, an elipse, a rectangle, a square, and other regular or non-regular polygons. The pin section 520C of the third NFT 158C may have a non-rectangular cross sectional shape other than a triangle (e.g., trapezoid, chevron) at its distal end.

Figure 6:
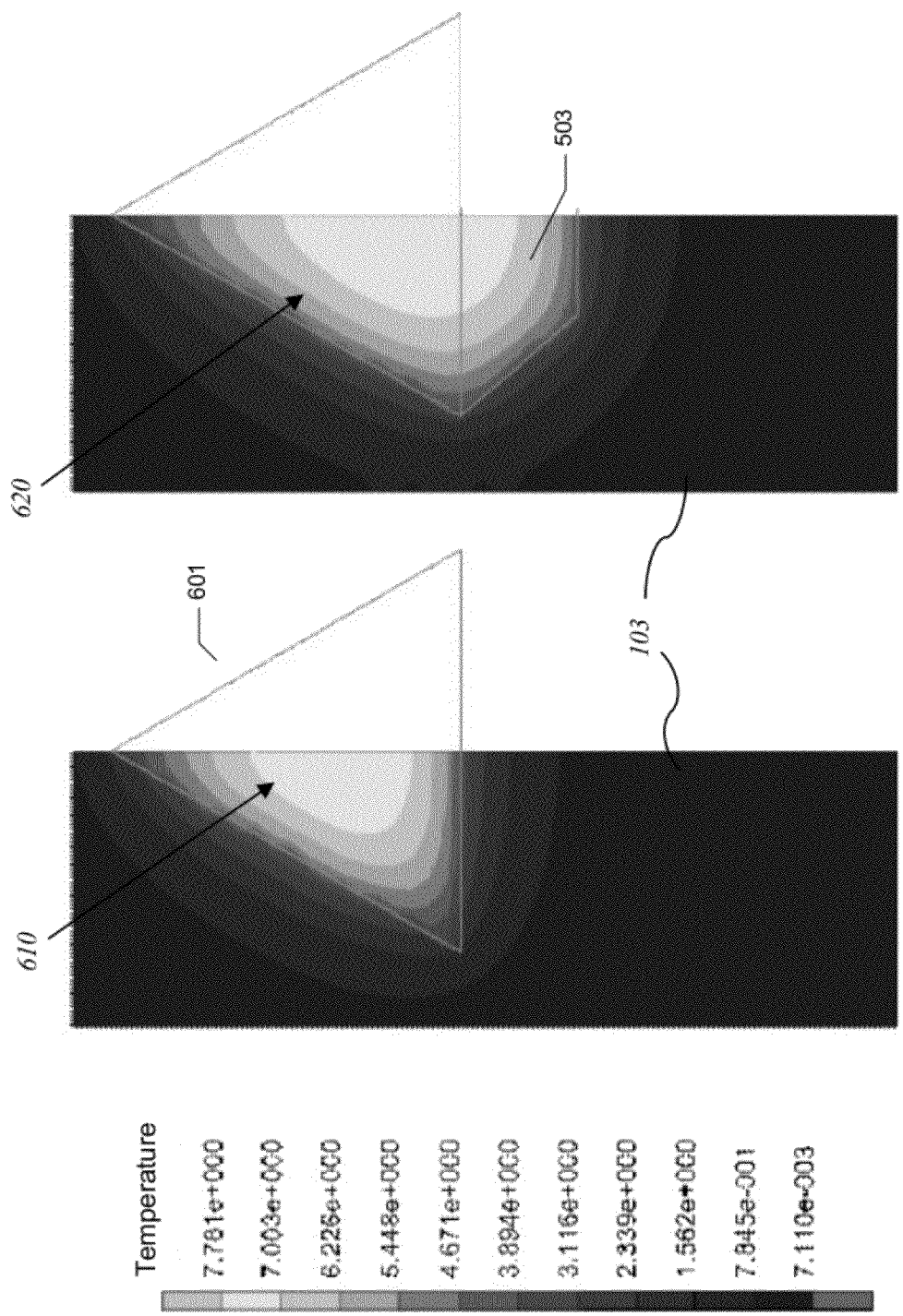
FIG. 6 shows a first simulated thermal spot associated with a first NFT arrangement in which at least a pin section of a triangular NFT is separated from the write pole by an insulator layer juxtaposed against a second simulated thermal spot associated with a second NFT arrangement in which both disk and pin sections of the triangular NFT are separated from the write pole by a conductive heat sink layer according to certain aspects of the subject disclosure.

FIG. 6 shows a first simulated thermal spot 610 juxtaposed against a second simulated thermal spot 620. In both cases, the NFTs are assumed to be a Puccini-type NFT (e.g., 158A of FIG. 5A) having a triangular pin cross section (e.g., 502A). An outline 501 of the triangular pin cross section is indicated in FIG. 6. The first thermal spot 610 (left) is associated with a first NFT arrangement in which a disk section of the NFT is separated from the write pole by a conductive heat sink layer (e.g., Cu) while a pin section of the NFT is separated from the write pole by an insulator layer (e.g., $Si_3N_4$). By contrast, the second thermal spot 620 (right) is associated with a second NFT arrangement in which both of the disk and pin sections of the NFT are separated from the write pole by a conductive heat sink layer (e.g., Cu). The trailing edge of the thermal spot 610 terminates substantially at the NFT (e.g., the triangular pin cross section 601) and does not extend substantially into a region of recording medium 103 below write pole (e.g., 122), resulting in a very flat trailing edge. By contrast, the trailing edge of the thermal spot 620 extends beyond the NFT and into a region 603 of recording medium 103 below write pole (e.g., 122). The comparison of the thermal spots 610, 620 illustrates that in a head with a NFT coupled to a write pole, an NFT arrangement having the combination of a non-rectangular NFT pin cross section and an insulator layer between the NFT's pin section and the write pole minimizes the trailing edge curvature.

Figure 7:
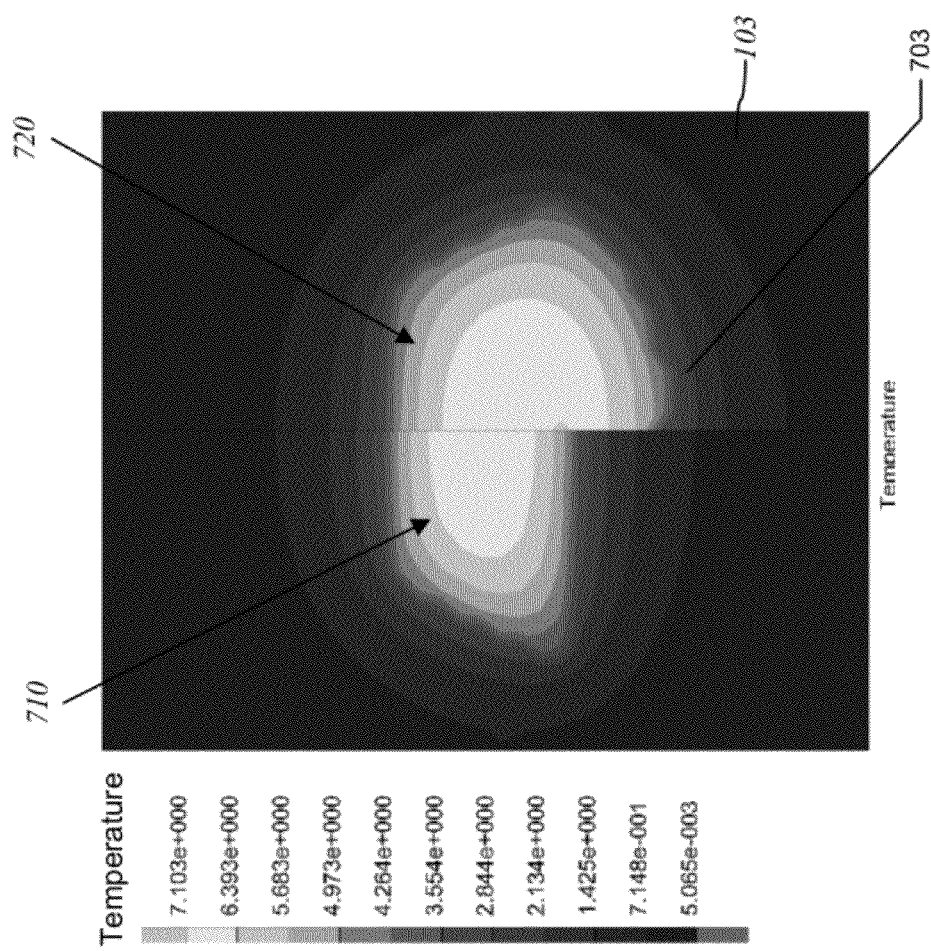
FIG. 7 shows a first simulated thermal spot associated with a first NFT arrangement in which at least a pin section of a trapezoidal NFT is separated from the write pole by an insulator layer juxtaposed against a second simulated thermal spot associated with a second NFT arrangement in which both disk and pin sections of the trapezoidal NFT are separated from the write pole by a conductive heat sink layer according to certain aspects of the subject disclosure.

FIG. 7 shows a first simulated thermal spot 710 juxtaposed against a second simulated thermal spot 720. In both cases, the NFTs are assumed to be a Puccini-type NFT (e.g., 158C of FIG. 5A) having a trapezoidal pin cross section (e.g., 502B). The first thermal spot 710 (left) is associated with a first NFT arrangement in which a disk section of the NFT is separated from the write pole by a conductive heat sink layer (e.g., Cu) while a pin section of the NFT is separated from the write pole by an insulator layer (e.g., $Si_3N_4$). By contrast, the second thermal spot 729 (right) is associated with a second NFT arrangement in which both disk and pin sections of the NFT is separated from the write pole by a conductive heat sink layer (e.g., Cu). The trailing edge of the thermal spot 710 terminates substantially at the NFT and does not extend into a region of recording medium 103 below write pole (e.g., 122). By contrast, the trailing edge of the thermal spot 720 extends beyond the NFT and into a region 703 of recording medium 103 below write pole (e.g., 122), A trapezoidal NFT (e.g., 158B) can have certain advantages including an easier manufacturability and a larger area for heat sinking into the write pole over a triangular NFT (e.g., 158A). The better heat sinking capability improves thermal reliability of an EAMR head incorporating a trapezoidal NFT.

Those skilled in the art shall appreciate that various NFT arrangements of subject disclosure provide a number of advantages including optimizing (e.g., flattening) the trailing edge of the thermal spot in an EAMR disk drive, e.g., by preventing or reducing skin-depth penetration of energy into the write pole and/or by providing a non-rectangular NFT cross section. The optimized trailing edge, in turn, can help EAMR heads incorporating the various NFT arrangements achieve a higher track density.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. An energy assisted magnetic recording (EAMR) head for writing to a recording media, the EAMR head comprising:
    a write pole for providing a magnetic field for writing to the recording media;
    at least one laser for providing energy to the recording media to assist the writing;
    a near field transducer (NFT) disposed adjacent to the write pole and coupled with the at least one laser, the NFT configured to direct the energy to a corresponding thermal spot on the recording media,
    wherein the NFT comprises a disk section and a pin section extending towards an air bearing surface (ABS) from the disk section, and
    wherein the disk section is separated from the write pole by a heat sink layer and at least a portion of the pin section is separated from the write pole by an insulating layer.

2. The EAMR head of claim 1, wherein at least the disk section of the NFT comprises a first material capable of supporting a surface-plasmon resonance in the disk section when subjected to the energy.

3. The EAMR head of claim 2, wherein the first material is selected from a group consisting of Au, Ag, Cu, and Al.

4. The EAMR head of claim 1, wherein the disk section of the NFT comprises a substantially circular disk comprising Au.

5. The EAMR head of claim 1, wherein the disk section and the pin section of the NFT comprise Au.

6. The EAMR head of claim 2, wherein the disk section is coupled to the write pole via a heat sink layer comprising a second material.

7. The EAMR head of claim 6, wherein the disk region of the NFT has a thickness in a range between about 10 and 100 nm, and the heat sink layer has a thickness in a range between about 10 and 100 nm.

8. The EAMR head of claim 6, wherein the second material is selected from a group consisting of Cu, Au, Ag, and Al.

9. The EAMR head of claim 6, wherein the first material exhibits a stronger surface-plasmon resonance than the second material.

10. The EAMR head of claim 6, wherein the first material is Au, and the second material is Cu.

11. The EAMR head of claim 1, wherein the corresponding thermal spot does not extend into a region of the recording media below the write pole.

12. The EAMR head of claim 1, wherein the insulating layer prevents a skin depth penetration of the energy into a corresponding portion of the write pole adjacent to the insulating layer.

13. The EAMR head of claim 1, wherein the pin section has a rectangular cross section in a plane parallel to the ABS.

14. The EAMR head of claim 1, wherein the pin section has a non-rectangular cross section in a plane parallel to the ABS.

15. The EAMR head of claim 1, wherein the pin section has a thickness in an along-track direction of between about 10 and 100 nm.

16. The EAMR head of claim 1, wherein the pin section has a width in a cross-track direction of between about 10 and 500 nm.

17. The EAMR head of claim 1, wherein the insulating layer has a thickness of between about 10 and 100 nm.

18. The EAMR head of claim 1, wherein the insulator layer comprises a material selected from a group consisting of $Si_3N_4$, $Al_2O_3$, AlN, GaN, $SiO_2$, and $BN_4$.

19. The EAMR head of claim 1, wherein the EAMR head is configured to write a plurality of radially-spaced overlapping data tracks of data on the recording media.

20. The EAMR head of claim 1, wherein the corresponding spot has a width not less than a track pitch of the recording media.

21. An energy assisted magnetic recording (EAMR) head for writing to a recording media comprising:
    a write pole for providing a magnetic field for writing to the recording media; and
    a near field transducer disposed adjacent to the write pole and comprising a disk section and a pin section extending towards an air bearing surface (ABS) from the disk section,
    wherein the disk section is separated from the write pole by a heat sink layer and at least a portion of the pin section is electrically isolated from the write pole by an insulator material.

* * * * *